US007729334B2

(12) United States Patent
Yi et al.

(10) Patent No.: US 7,729,334 B2
(45) Date of Patent: Jun. 1, 2010

(54) APPARATUS AND METHOD FOR TRANSMITTING DATA BLOCKS BASED ON PRIORITY

(75) Inventors: Seung-June Yi, Seoul (KR); Young-Dae Lee, Gyeonggi-do (KR); Sung-Duck Chun, Seoul (KR)

(73) Assignee: LG Electronics Inc., Seoul (KR)

( * ) Notice: Subject to any disclaimer, the term of this patent is extended or adjusted under 35 U.S.C. 154(b) by 954 days.

(21) Appl. No.: 11/097,762

(22) Filed: Mar. 31, 2005

(65) Prior Publication Data
US 2005/0238051 A1 Oct. 27, 2005

(30) Foreign Application Priority Data
Mar. 31, 2004 (KR) .................... 10-2004-0022435

(51) Int. Cl.
*H04J 3/24* (2006.01)
(52) U.S. Cl. ...................... 370/349; 370/469
(58) Field of Classification Search ............. 370/235, 370/405, 432, 469, 230.1, 231, 349, 352, 370/395.43, 409, 465, 466, 477; 455/450; 379/469
See application file for complete search history.

(56) References Cited
U.S. PATENT DOCUMENTS

| 6,374,117 | B1* | 4/2002 | Denkert et al. ............. 455/522 |
| 6,577,596 | B1 | 6/2003 | Olsson et al. |
| 7,319,667 | B1* | 1/2008 | Biederman .................. 370/231 |
| 2001/0055298 | A1* | 12/2001 | Baker et al. ................. 370/349 |
| 2002/0089993 | A1* | 7/2002 | Suumaki et al. ............. 370/405 |
| 2003/0036384 | A1 | 2/2003 | Chen et al. |
| 2003/0119452 | A1 | 6/2003 | Kim et al. |
| 2003/0207696 | A1 | 11/2003 | Willenegger et al. |
| 2004/0008646 | A1 | 1/2004 | Park et al. |
| 2004/0057437 | A1* | 3/2004 | Daniel et al. ........... 370/395.43 |
| 2004/0077355 | A1* | 4/2004 | Krenik et al. ............... 455/450 |
| 2005/0074024 | A1* | 4/2005 | Kim et al. ................... 370/432 |
| 2005/0075124 | A1 | 4/2005 | Willenegger et al. |
| 2005/0147040 | A1* | 7/2005 | Vayanos et al. ............. 370/235 |

FOREIGN PATENT DOCUMENTS

| CN | 1318267 | 10/2001 |
| EP | 0994604 A2 | 4/2000 |
| EP | 1209862 A1 | 5/2002 |
| EP | 1372350 | 12/2003 |
| WO | WO 99/09775 A2 | 2/1999 |
| WO | WO 03/047189 A1 | 6/2003 |
| WO | 2004/017541 | 2/2004 |

\* cited by examiner

*Primary Examiner*—Kwang B Yao
*Assistant Examiner*—Andrew Lai
(74) *Attorney, Agent, or Firm*—Lee, Hong, Degerman, Kang & Waimey

(57) ABSTRACT

A particular protocol layer of the transmitting side (transmitter) initially receives service data units (SDUs) having the same priority through a single stream from an upper layer, processes these SDUs to generate protocol data units (PDUs) having different priorities, and uses respectively different transmission methods to transmit the generated PDUs over a radio interface in order to guarantee their respectively different quality of service (QoS) requirements.

21 Claims, 10 Drawing Sheets

APPARATUS AND METHOD FOR TRANSMITTING DATA BLOCKS BASED ON PRIORITY

CROSS REFERENCE TO RELATED APPLICATIONS

Pursuant to 35 U.S.C. §119(a), the present application claims the benefit of earlier filing date and right to priority to Korean application number 10-2004-022435, filed Mar. 31, 2004; the disclosure of which is incorporated herein in its entirety.

BACKGROUND AND SUMMARY

The present invention relates to an apparatus and method for transmitting data blocks based on priority from a transmitter in a UMTS (Universal Mobile Telecommunications System) type IMT-2000 system, and in particular, to an apparatus and method for transmission whereby a particular protocol layer determines the priority of each data block among the data blocks received from an upper layer through a single data stream, transfers the determined priorities together with the data blocks to a lower layer through a single data stream, and the lower layer receiving the data blocks with their priorities guarantees the respective quality of service (QoS) according to each respective priority for each data block for transmission over the radio interface, to thus guarantee a respectively different QoS for each data block within a single data stream having the same QoS being guaranteed.

A universal mobile telecommunication system (UMTS) is a third generation mobile communications system that has evolved from the European Global System for Mobile communications (GSM) that aims to provide an improved mobile communications service based upon a GSM core network and wideband code division multiple access (W-CDMA) wireless connection technology.

FIG. 1 illustrates an exemplary basic architecture of a UMTS network. As shown in FIG. 1, the UMTS is roughly divided into a terminal 100 (mobile station, user equipment (UE), etc.), a UMTS Terrestrial Radio Access Network (UTRAN) 120, and a core network (CN) 130. The UTRAN 120 includes one or more radio network sub-systems (RNS) 125. Each RNS 125 includes a radio network controller (RNC) 123, and a plurality of base stations (Node-Bs) 121 managed by the RNC 123. One or more cells exist for each Node B 121.

The RNC 123 handles the assigning and managing of radio resources, and operates as an access point with respect to the core network 130. The Node-Bs 121 receive information sent by the physical layer of the terminal 100 through an uplink, and transmit data to the terminal through a downlink. The Node-Bs 121, thus, operate as access points of the UTRAN 120 for the terminal 100. Also, the RNC 123 allocates and manages radio resources and operates as an access point with the core network 130. Between various network structure elements, there exists an interface that allows data to be exchanged for communication therebetween.

FIG. 2 illustrates a radio interface protocol architecture that exists in the mobile terminal and in the UTRAN as one pair, for handling data transmissions via the radio interface. Regarding each radio protocol layer, the first layer (Layer 1) is a physical layer (PHY) that serves the purpose of transmitting data over the radio interface by using various radio transmission techniques. The PHY layer is connected with an upper layer, the MAC layer via transport channels, which include a dedicated transport channel and a common transport channel depending upon whether that channel is shared or not.

In the second layer (Layer 2), a medium access control (MAC) layer, a radio link control (RLC) layer, a packet data convergence protocol (PDCP) layer and a broadcast/multicast control (BMC) layer exist. The MAC layer serves the purpose of mapping various logical channels to various transport channels, as well as performing logical channel multiplexing for mapping a plurality of logical channels to a single transport channel. The MAC layer is connected to a higher layer (e.g., the RLC layer) via logical channels, and these logical channels are divided into control channels that transmit control plane information and traffic channels that transmit user plane information.

The RLC layer handles the guaranteeing of the quality of service (QoS) of each radio bearer (RB) and the transmission of the corresponding data thereof. To guarantee the unique QoS of a radio bearer, the RLC layer has therein one or two independent RLC entities for each radio bearer, and provides three types of RLC modes; a transparent mode (TM), an unacknowledged mode (UM), and an acknowledged mode (AM), in order to support the various QoS. Also, the RLC layer adjusts the data size accordingly such that a lower layer may transmit data over the radio interface, by performing segmentation and concatenation on the data received from an upper layer.

The PDCP layer is located above the RLC layer and allows data that is transmitted by using Internet Protocol (IP) packets, such as IPv4 or IPv6, to be effectively transmitted over a radio interface having a relatively smaller bandwidth. For this purpose, the PDCP layer performs a header compression function, whereby only the absolutely necessary data in the header portion of the data are transmitted, in order to increase transmission efficiency over the radio interface. Because header compression is its basic function, the PDCP layer only exists in the PS (packet switched) domain, and a single PDCP entity exists per each radio bearer (RB) for providing effective header compression function with respect to each PS service.

Additionally, in the second layer (L2), a BMC (Broadcast/Multicast Control) layer exists above the RLC layer for performing the functions of scheduling cell broadcast messages and broadcasting to terminals located in a particular cell.

The radio resource control (RRC) layer located at the lowest portion of the third layer (L3) is only defined in the control plane, for controlling the parameters of the first and second layers and for controlling the transport channels and the physical channels in relation to the establishment, the re-configuration, and the releasing of the radio bearers (RBs). Here, the RB refers to a logical path provided by the first and second layers of the radio protocol for data transfer between the terminal and the UTRAN. And in general, the establishment of a radio bearer (RB) refers to regulating the protocol layers and the channel characteristics of the channels required for providing a specific service, as well as setting their respective specific parameters and operation methods.

Hereafter, the establishment of a radio bearer according to a quality of service (QoS) will be explained. QoS refers to the quality of service that the end-user notices upon being provided with a particular service. Various factors affect the QoS, such as delay time, error ratio, bit rate, and the like. In UMTS, an appropriate QoS is determined according to the type of service that is to be provided to the end-user. Here, the appropriate QoS refers to a minimum QoS that allows the end-user to be provided with the service, and the reason for setting a minimum QoS is to allow the service to be provided to a plurality of users. Namely, because radio resources are limited, providing a service using a high QoS to a particular user means that a large amount of radio resources are allocated to that particular user, and thus the total number of users to which service can be provided by the UMTS is decreased when considering the overall cell in which service is being provided.

In UMTS, as the entity that determines the QoS for a certain type of service, a MSC (Mobile Switching Center) is used for CS (circuit switched) services, while a SGSN (Serving GPRS Supporting Node) or a GGSN (Gateway GPRS Supporting Node) is used for PS (packet switched) services, and these entities exist within the core network (CN). When the QoS determining entities receive a request for a particular service from a terminal or an entity outside of the UMTS, an overall QoS is determined between the terminal and the QoS determining entity.

FIG. 3 depicts how the QoS between the terminal (UE) the Node B/RNC and the MSC (SGSN/GGSN) are defined. In FIG. 3, the QoS is separately established by sections, which can be broadly divided into a "Iu section" that is a wired (wireline) interface between the MSC (or the SGSN/GGSN) to the Node B/RNC, and a "Uu section" that is a wireless (radio) interface between the Node B/RNC and the terminal. Also, the Iu section has a Iu Bearer and the Uu section has a radio bearer (RB) established, respectively, for providing services having an appropriate QoS. The overall QoS between the terminal and the MSC (or the SGSN/GGSN) is determined by the sum of the quality of service for the Iu interface ("QoS-Iu") and the quality of service for the Uu interface ("QoS-Uu"). As the wireless interface has a more disadvantageous environment when compared to that of the wired interface, the overall QoS mostly depends upon the QoS-Uu.

The details of the QoS and bearer configuration procedures will be explained with respect to a VoIP (Voice over Internet Protocol) service as being a representative example of a PS service. First, assuming that the SGSN received a request for VoIP service from a terminal, the SGSN determines an appropriate QoS for providing the requested VoIP service by considering the priority and/or capabilities of the terminal and/or considering various types of available resources. Also, it is assumed that the SGSN determined the overall QoS with the following parameters: Delay=200 ms; Error Ratio=$10^{-2}$; Bit Rate=36 kbps. Based upon this overall QoS, the SGSN then determines the QoS for each section. Here, because the wired interface generally has a more advantageous environment compared to that of the wireless interface, it does not greatly affect the overall QoS. Namely, the wired interface has a delay of less than a few milliseconds (ms), an error ratio of less than $10^{-6}$ and a bit rate of several to several hundred megabits per second (Mbps), thus most of the values for the overall QoS are directly applicable to the QoS-Uu. Generally, the error rate and bit rate of the overall QoS are directly applied to the QoS-Uu, and a delay value that excludes a few milliseconds (ms) needed for the core network protocol to process data is applied. Thus, for this situation, it is assumed that the SGSN determined the QoS-Uu to have the following parameters: Delay=180 ms; Error Ratio=$10^{-2}$; Bit Rate=36 kbps. Then, the SGSN informs this determined QoS-Uu to the RNC, and the RNC configures an appropriate radio bearer (RB) in accordance thereto.

The RNC configures the RB based upon the QoS-Uu informed by the SGSN. More accurately, the RRC layer, which is a radio protocol layer within the RNC, configures the RB. As explained previously, the RB refers to a logical path provided by the first and second layers of the radio protocol, and the data transmitted through the RB are basically guaranteed the quality corresponding to the QoS-Uu. In order to configure an RB that satisfies the QoS-Uu, the RRC layer of the RNC configures the first and second layers of the radio protocol, and various characteristics, operation procedures, parameters, and the like for each of the channels. For example, with respect to the PDCP layer, the type of header compression method to be used, etc. are determined. With respect to the RLC layer, the type of operation mode to be used, the maximum data storage time to be used, the size of the RLC PDU (protocol data unit) to be used, various timer values and protocol parameter values to be used, etc. are determined. With respect to the MAC layer, the type of channel mapping to be used, the method of channel multiplexing to be used, the method of priority processing to be used, how to perform transmission format combinations, etc. are determined. With respect to the PHY (physical) layer, the method of modulation to be used, the coding methods to be used, the type of CRC (cyclic redundancy check) to be used, the transmission power level to be used, the types of physical channels to be used, etc. are determined.

After the RRC of the RNC determines all of the aspects of the RB, the first and second layers of the RNC are established according to the determined aspects, and simultaneously informs these aspects to the RRC of the terminal to allow the first and second layers of the terminal to be established according to these aspects. When the RB is established in this manner, a logical path between the terminal and the RNC is formed, and thereafter, data is transmitted according to the determined path. Here, as explained before, because a single RB guarantees a single QoS-Uu, the data transmitted through the same RB are all guaranteed the same QoS-Uu.

In the related art, because a single RB guarantees a single QoS (QoS-Uu), the data transmitted through the same RB is guaranteed the same QoS. However, there are certain situations where the data transmitted via a single RB will have respectively different priorities according to the processing techniques of the radio protocol layers, thus requiring respectively different QoS to be guaranteed. The header compression performed at the PDCP layer is an example of one such situation.

The header compression technique utilizes the fact that many portions of the IP headers of IP packets that are part of the same packet stream do not change at all or do not change very often. The fields that do not change are stored in the format of context within a compressor of the transmitting side (i.e., transmitter) and within the decompressor of the receiving side (i.e., receiver), and the overhead of an IP header can be reduced by only transmitting those fields that have changed after the context has been formed. During the initial stages of header compression, because the compressor transmits full header packets to the decompressor in order to form the context with respect to the corresponding packet stream, there is no gain (advantage) of using header compression. But after the context is formed in the decompressor, the compressor only transmits compressed header packets, and thus the gain (advantage) is drastic.

For a particular packet stream, determining whether to transmit a certain packet with a full header or with a compressed header can be entirely dependent upon the compressor. However, in general, when context is to be initially formed for a particular packet stream, one or more full header packets should be transmitted. As compressed header packets are transmitted thereafter, upon the lapse of a certain time period, one or more full header packets are transmitted intermittently such that the context of the decompressor is maintained in synchronization with the context of the compressor.

FIG. 4 depicts an example of how full header packets and compressed header packets are transmitted when using a header compression technique. When the compressor of the PDCP in the transmitter receives an IP packet from an upper layer, the corresponding packet is transmitted to the receiver as a full header packet or a compressed header packet according to the pattern of the header. If it is determined that there is a need to form a new context or a need to update the context, the compressor transmits the packet as a full header packet. If it is determined that the context with respect to the header pattern of the corresponding packet is already formed in the decompressor, then the compressor transmits the packet as a compressed header packet.

The decompressor of PDCP in the receiver forms a context by first receiving a full header packet for a certain packet stream. This is because the context will be the basis from which the compressed headers to be received will be decompressed. If the decompressor receives compressed header packets in a state where the context has not been formed, the decompressor cannot decompress the original header of the corresponding packet and thus will discard that received packet.

As such, when a header compression technique is used in a radio interface for a certain PS service, the PDCP in the transmitter transmits the IP packets that were received from an upper layer in a single stream having the same QoS, in either a "packet for forming or updating context" format or a "a packet for not forming or updating context" format. However, if a "packet for forming or updating context" is not successfully transmitted to the receiver, all subsequently transmitted "packets for forming or updating context" cannot be decompressed at the receiver and are thus discarded. Thus, a "packet for forming or updating context" is relatively much more important (i.e., has higher priority) than a "packet for not forming or updating context".

However, in the related art, all the data transmitted via a single RB has the same QoS, and relatively more important data cannot be transmitted with a higher QoS when compared to relatively less important data. Thus, there is a need for allowing data to be transmitted with different QoS according to its importance (i.e., priority), even though the data is transmitted via a single RB.

Thus, the inventors of the present invention recognized such drawbacks of the related art and provided a solution by providing a particular protocol layer of the transmitting side (transmitter) that initially receives service data units (SDUs) having the same priority through a single stream from an upper layer, processes these SDUs to generate protocol data units (PDUs) having different priorities, and uses respectively different transmission methods to transmit the generated PDUs over a radio interface in order to guarantee their respectively different quality of service (QoS) requirements.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
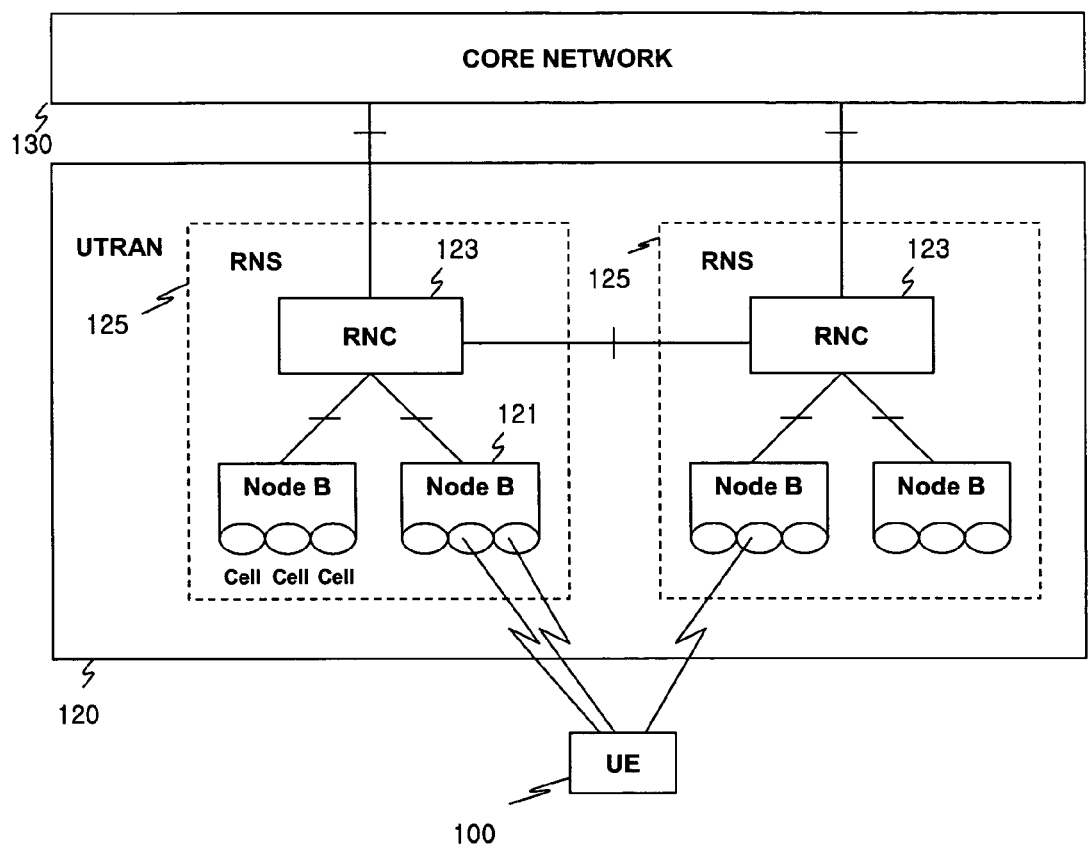
FIG. 1 depicts an exemplary basic structure of a UMTS network.
Figure 2:
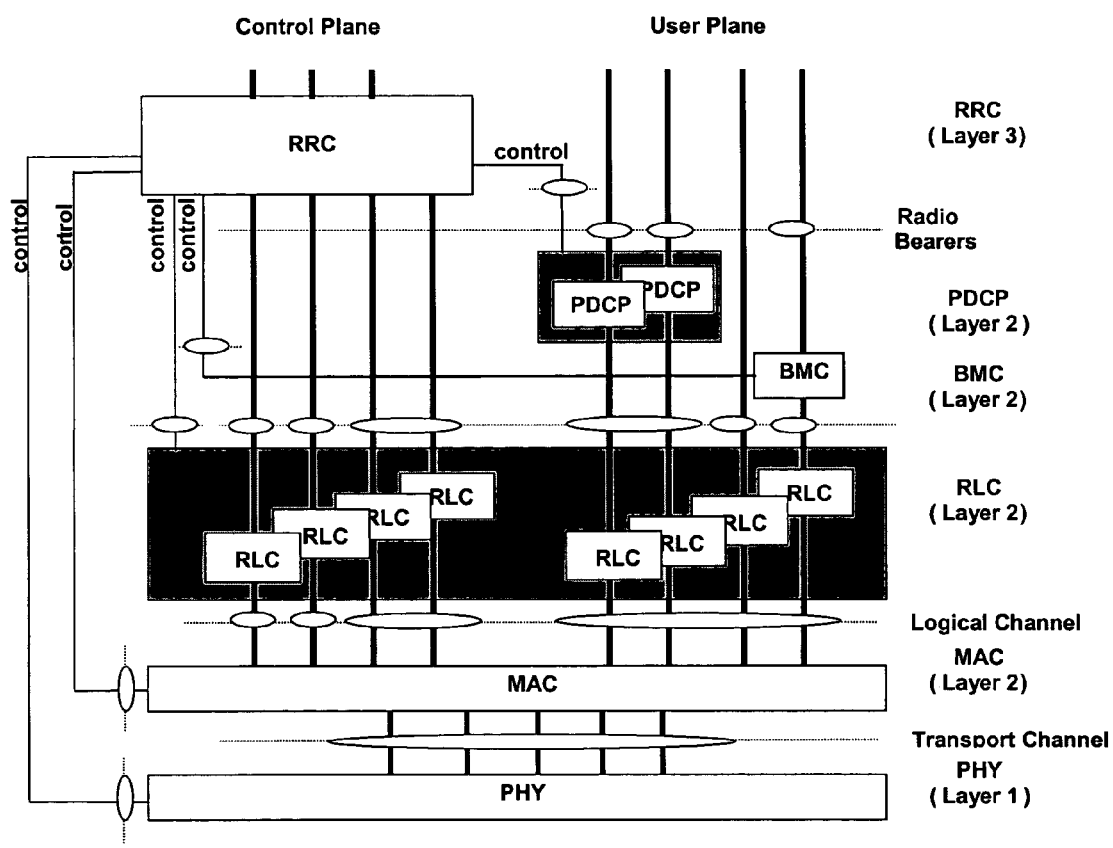
FIG. 2 depicts a radio access interface protocol architecture between the terminal and UTRAN that is based upon the 3GPP wireless access network.
Figure 3:
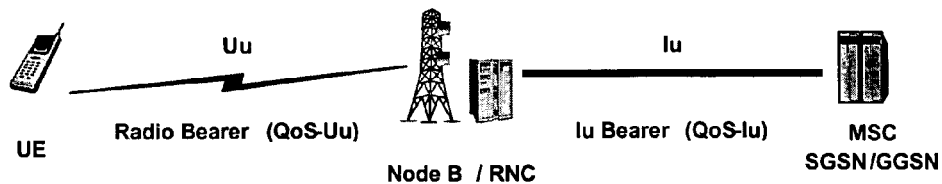
FIG. 3 depicts an example of how the QoS between the terminal (UE) the Node B/RNC and the MSC (SGSN/GGSN) can be defined.
Figure 4:
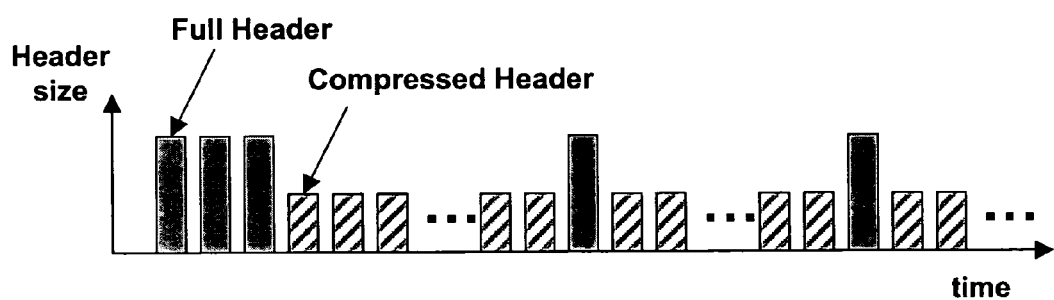
FIG. 4 depicts an example of how full header packets and compressed header packets are transmitted when using a header compression technique.

The following description is based upon the presently preferred exemplary and non-limiting embodiments of the present invention. More particularly, various inventive concepts and principles embodied in systems and methods therein are discussed and described.

In order to address the related art problems, the present invention proposes that a particular protocol layer of the transmitting side (transmitter) initially receives service data units (SDUs) having the same priority through a single stream from an upper layer, processes these SDUs to generate protocol data units (PDUs) having different priorities, and uses respectively different transmission methods to transmit the generated PDUs over a radio interface in order to guarantee their respectively different quality of service (QoS) requirements.

Additionally, the present invention proposes a method by which the priority information of each PDU is also transferred when each of the radio protocol layers transfers the PDUs having different priorities to its lower layers.

The present invention provides a method of processing data packets for a radio communications system employing a protocol stack with protocol layers therein, the method comprising: receiving data packets from an upper layer, each data packet having priority information related thereto generated by and sent from the upper layer; processing the received data packets by using the priority information; and transferring the processed data packets to a first lower layer according to the priority information.

Preferably, the data packets can be received in service data units and transferred in protocol data units. Also, the receiving, processing and transferring procedures can be performed by a RLC layer.

Here, the upper layer can be a PDCP layer, and the PDCP layer can receive SDUs, can perform header compression thereto to generate PDUs, and can transfer each generated PDU together with its priority information.

The priority information can indicate whether the corresponding data packet includes a full header or a compressed header. For example, a data packet including a full header has higher priority than a data packet including a compressed header.

Preferably, the first lower layer can be a MAC layer.

Also, the transferring can be performed by transmitting the data packets repetitively and randomly according to their priorities, or by transmitting the data packets using respectively different radio channels according to their priorities, or by transmitting the data packets using respectively different radio transmission techniques for a single radio channel according to their priorities.

Here, the transferring can be performed via respectively different logical channels such that each logical channel is used to transfer data packets of a certain priority. Also, a total number logical channels can equal a total number of different priorities.

The above method can further comprise the steps of: receiving the processed data packets having different priorities by the first lower layer via at least one data flow; and transferring the received data packets to a second lower layer according to their respective priorities via respectively different logical channels.

Here, a total number of data flows received from the first lower layer can equal a total number of different priorities. Also, the second lower layer can be a PHY layer.

The above method can further comprise the steps of: receiving the data packets from the second lower layer via at least one data flow; and transmitting the received data packets to a receiver by using different transmission power levels corresponding to the priorities.

Preferably, data packets of relatively higher priority can be transmitted by using a relatively higher transmission power. Also, the steps can be performed in order to guarantee respectively different qualities of service requirements. Additionally, the receiver can be a mobile station, a user equipment, or other communications terminal.

Hereafter, each particular method will be explained for an exemplary situation where Internet Protocol (IP) packets are transmitted over a radio interface after header compression is performed thereto.

First, the PDCP layer receives IP packets (namely, SDUs) through a single stream from an upper layer and performs header compression thereto to generate PDUs that include full headers or compressed headers. Then, the PDCP layer transfers the generated PDUs to the RLC layer together with information indicating the priority for each PDU. Here, such priority information can be expressed in a variety of ways. For example, whether the packet includes a full header or a compressed header may be informed, or the priorities may be divided into many levels (degrees) such that packets including full headers are regarded as high priority and packets including compressed headers are regarded as low priority, or various other expressions (e.g., degrees of priority or importance) may be used.

Figure 5:
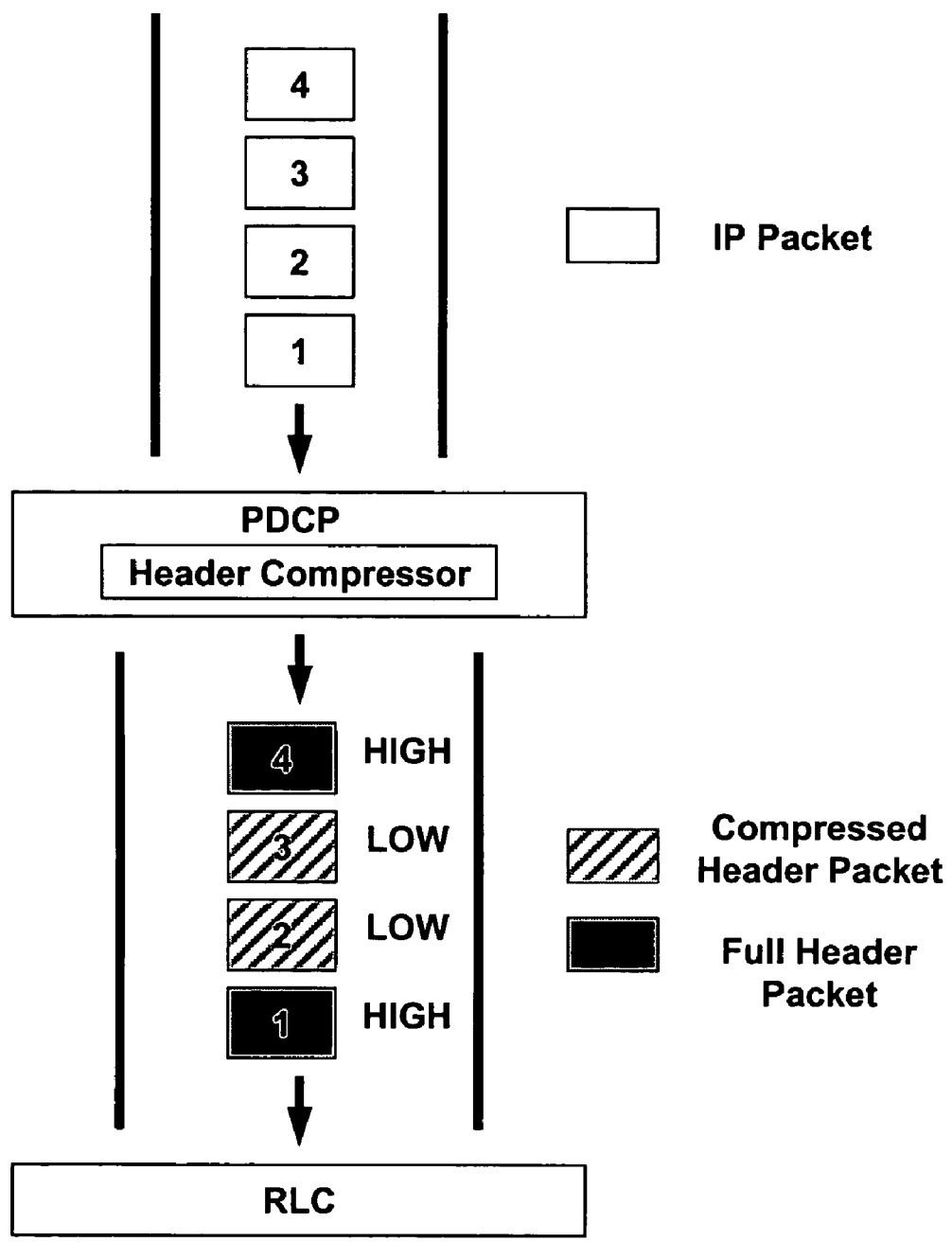
FIG. 5 shows how the priority information is also transferred together when the PDCP layer transfers PDUs to the RLC layer.

FIG. 5 shows how the priority information is also transferred together when the PDCP layer transfers PDUs to the RLC layer. Although the transferring of PDUs together with their priorities from the PDCP layer to the RLC layer is shown, other radio protocol layers may transfer PDUs together with their priority information to its lower layer.

There can be many transmitting methods used for a radio protocol layer to guarantee respectively different QoS according to the priority of data. The present invention presents a few exemplary methods merely for the sake of explanation, but it can be easily understood that other methods can be used as well.

(1) Method for Repetitive Transmission of Priority Data.

This method relates to randomly transmitting high priority data (i.e., important data) repetitively several times performed by a particular radio protocol layer. The repetitive transmission may be based upon feedback information from the receiving side (receiver) or without such feedback information. Also, for repetitive transmissions without feedback from the receiving side, the data with high priority may be consecutively transmitted repeatedly, or after initially transmitting once, the high priority data may be selectively transmitted repeatedly during a selected duration when no other data needs to be transmitted or a small amount of other data needs to be transmitted. For either method, the radio protocol layer requires a function of storing the important (priority) data to allow repetitive transmission thereof.

Figure 6:
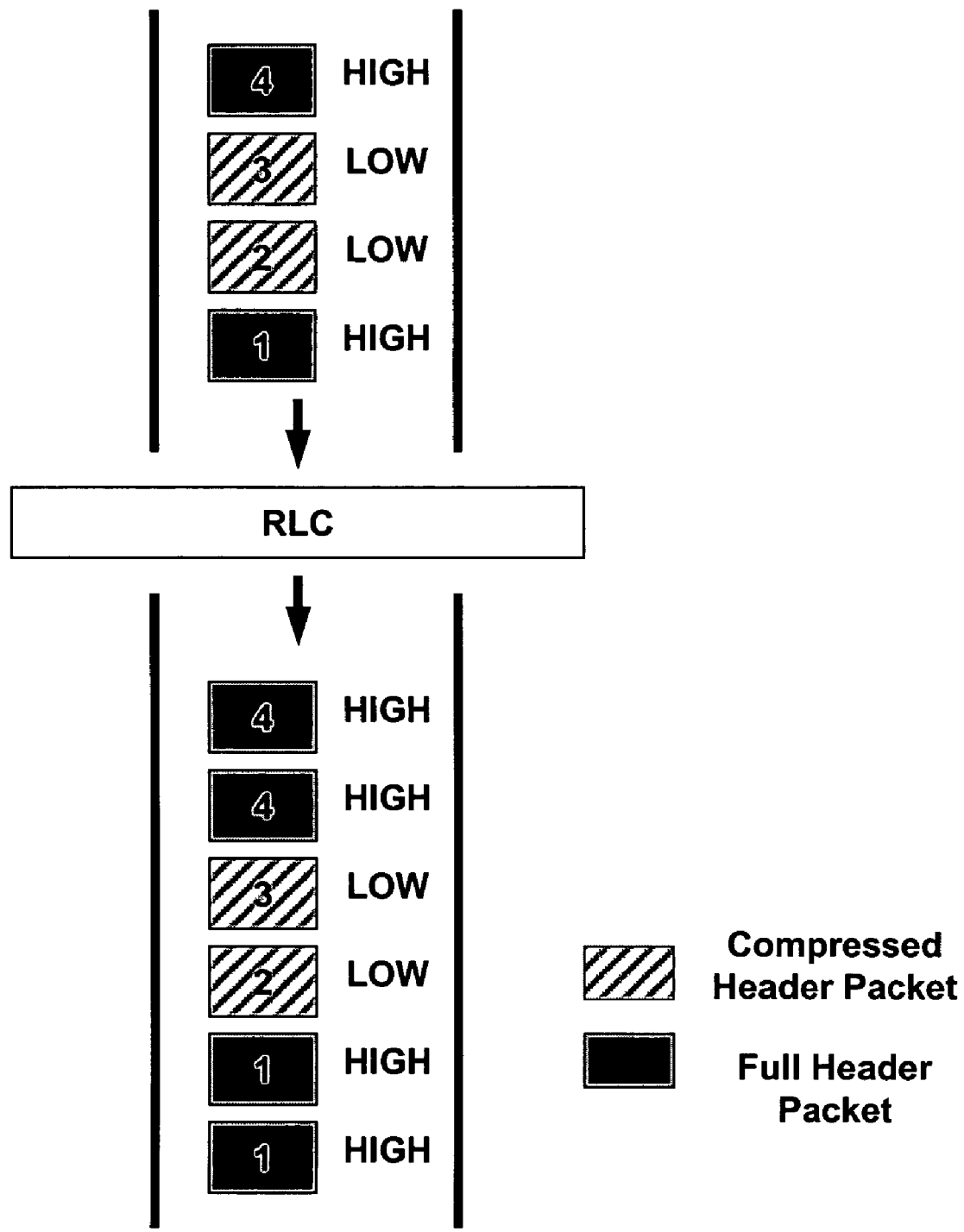
FIG. 6 shows an example where the RLC layer consecutively transmits priority data two times.

FIG. 6 shows an example where the RLC layer consecutively transmits priority data two times. Although not shown in FIG. 6, if there are three or more types of priorities, the number of repetitive transmissions can be set differently according to the priorities. Also, although the repetitive transmission of priority data is exemplary shown for an RLC layer, such repetitive transmissions can also be performed by other types of radio protocol layers.

(2) Method of Transmitting Data Using Respectively Different Radio Channels According to Priority.

In this method, a plurality of radio channels are established for one radio bearer (RB) according to the number of priority data types, and the data are transmitted through respectively different radio channels according to their priority. To achieve this, a function for a particular layer of the radio protocol to discriminate according to priority, the data received through a single stream from an upper layer and to transmit such data via different channels is necessary.

Figure 7:
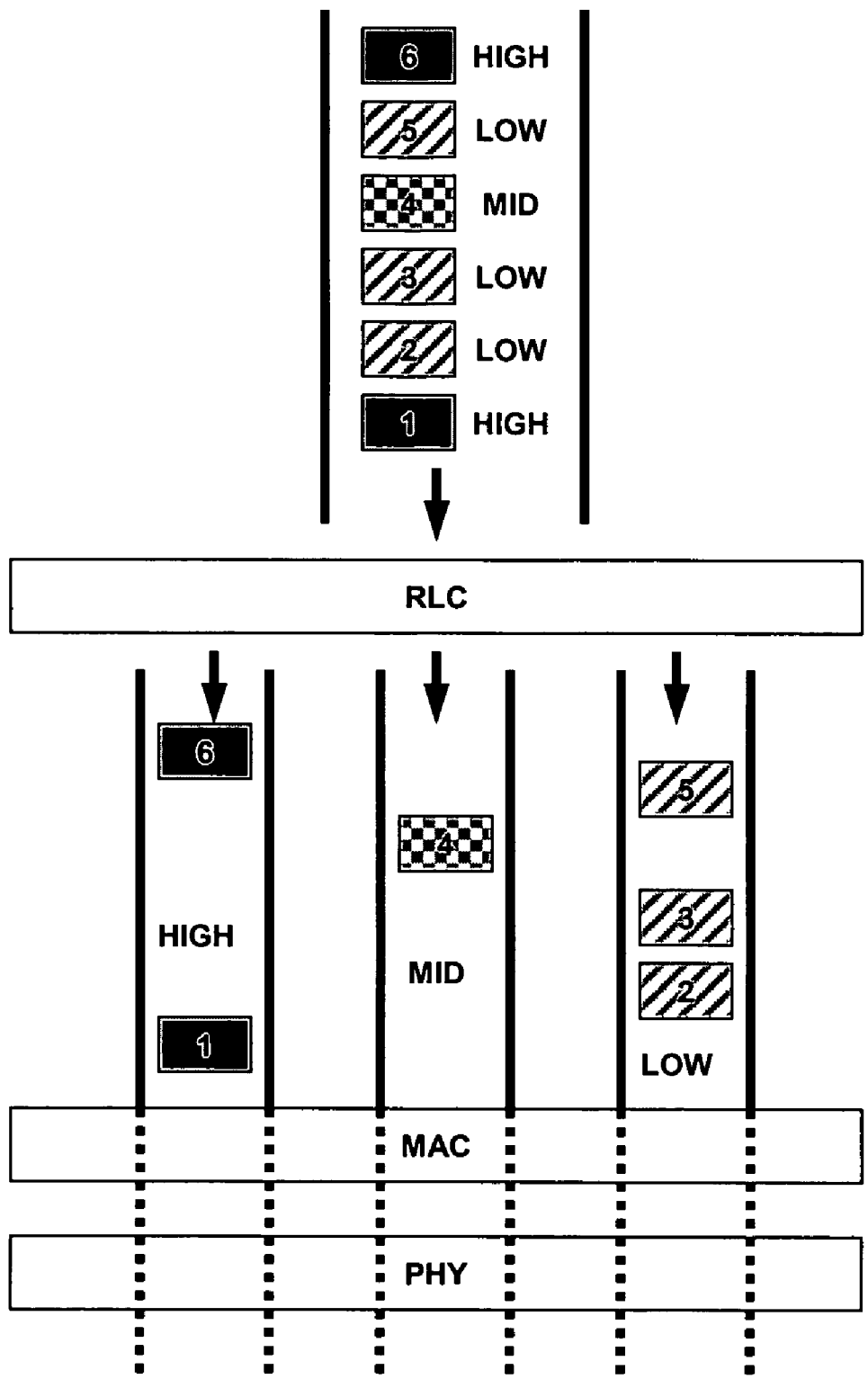
FIG. 7 shows an example of a discrimination transmission function performed at the RLC layer.

FIG. 7 shows an example of a discrimination transmission function performed at the RLC layer. As shown, the RLC layer receives from an upper layer, SDUs having three different kinds of priorities, and transfers these SDUs to a MAC layer according to their priorities through respectively different logical channels. Then, the MAC layer and the PHY layer use the transport channel and physical channel respectively connected to each logical channel to transmit the data of different priorities through respectively different channels. Here, the MAC layer and the PHY layer should be established such that a higher QoS is guaranteed for the channels used for transmitting high priority data. As the data are transmitted through respectively different channels according to their priorities, when the RLC layer delivers data to the MAC layer, the priority of each data may be delivered in a different order than that shown in FIG. 7.

For example, referring to FIG. 7, data 1 (data unit 1) and data 6 having the highest priority are transmitted first, then data 4 having middle level (intermediate) priority is transmitted, and finally, data 2, data 3, and data 5 having the lowest priority are transmitted last. Alternatively, upon transmitting the highest priority data (data 1 and 6), if the channel conditions allow for transmission of additional data, then the next highest priority data (e.g., data 4) can also be transmitted together with data 1 and 6. In other words, data (data units, packets) of different priority levels may be transmitted together if channel conditions, radio resources, or other circumstances allow for such transmissions.

Also, referring to FIG. 7, it can be said that the present invention allows a single stream of data (data units, packets, etc.) received from an upper layer to be divided into two or more radio bearers used for transmitting the data to a lower layer, based upon the levels of priority for the data, for achieving the purpose of guaranteeing different qualities of service for the data (data units, packets, etc.).

(3) Method Employing Respectively Different Radio Transmission Techniques According to Priority.

In this method, when data having respectively different priorities are transmitted through a single radio channel, respectively different transmission techniques are used according to the different priorities. In essence, this method controls the QoS by units of data blocks (or data units or packets) and not by channels, which allows more exact QoS control.

Radio transmission techniques refer to those procedures that are used to allow reliable transmission of data over a radio (wireless) interface. A transmission profile may be determined for a radio transmission technique. Examples include modulation, coding, spreading, interleaving, power control, forward error correction (FEC), rate matching, diversity, and the like. In a broad sense, the previously explained first method for repetitive transmission of priority data can be considered as a type of radio transmission technique.

The present invention provides a method in which the various radio transmission techniques explained above are appropriately applied according to the priority of each data block to achieve data transmissions with a QoS being guaranteed according to each priority. To achieve this, the protocol layer that applies such radio transmission technique must also receive the priority of each data block when the data blocks are received from an upper layer, and an appropriate radio transmission technique should be selected based upon the received priorities.

Figure 8:
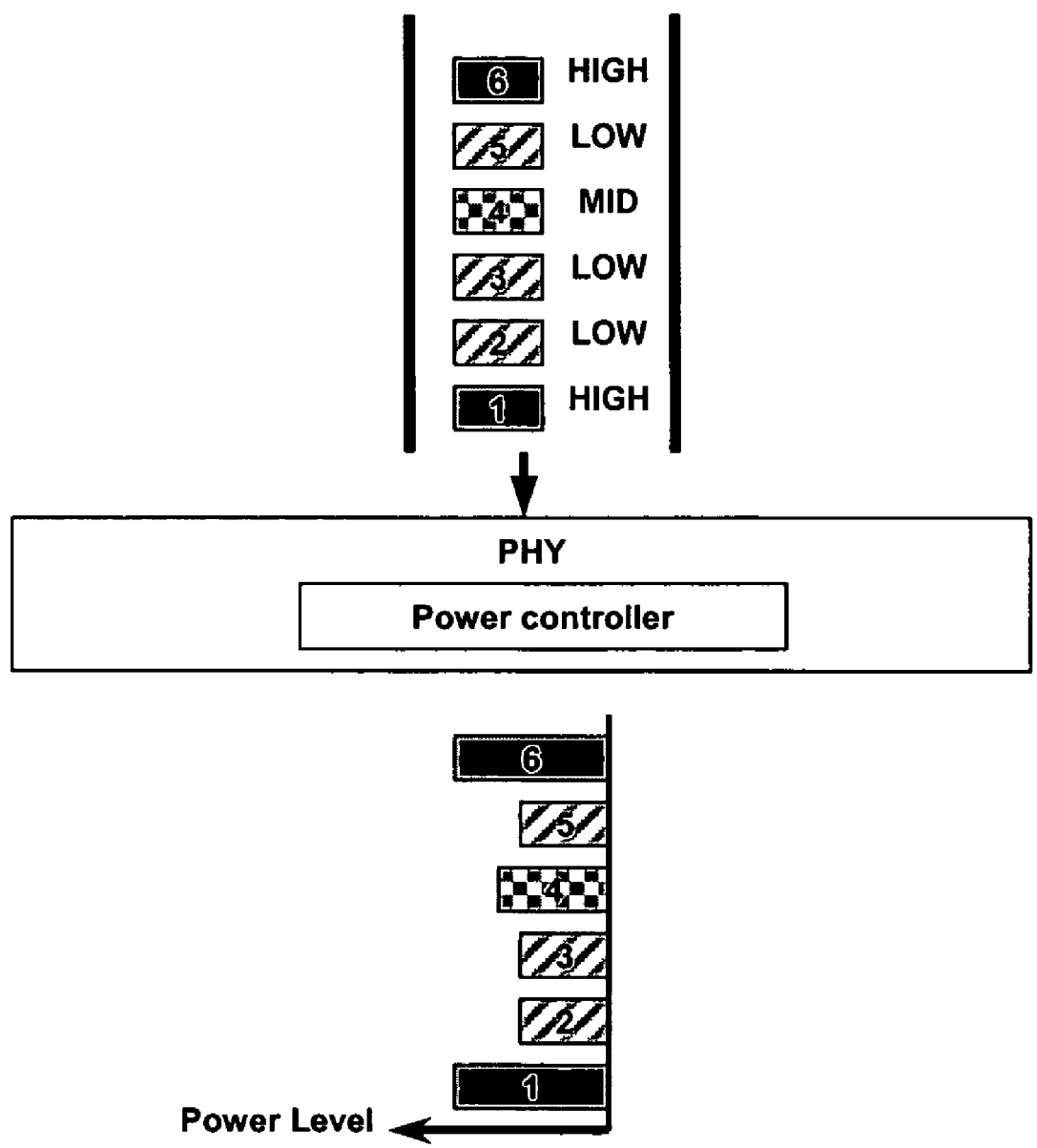
FIG. 8 shows an exemplary method where the PHY layer receives from the MAC layer, data blocks having three types of priorities, and three levels of transmission power are used to transmit these data blocks.

FIG. 8 shows an exemplary method where the PHY layer receives from the MAC layer, data blocks having three types of priorities, and three levels of transmission power are used to transmit these data blocks over the radio interface according to the respective priority of each data block, thus allowing important (priority) data to be transmitted in a more stable and dependable manner. In this case, because the important data are transmitted by only having the transmission power increased while all other conditions are maintained the same, this has the effect of lowering the error rate at the receiving side (receiver). An example of adjusting the transmission power is shown, but other types of radio transmission techniques are also applicable. Additionally, an example of the PHY layer performing the adjusting is shown, but this method can be applied to other radio protocol layers as well.

Figure 9:
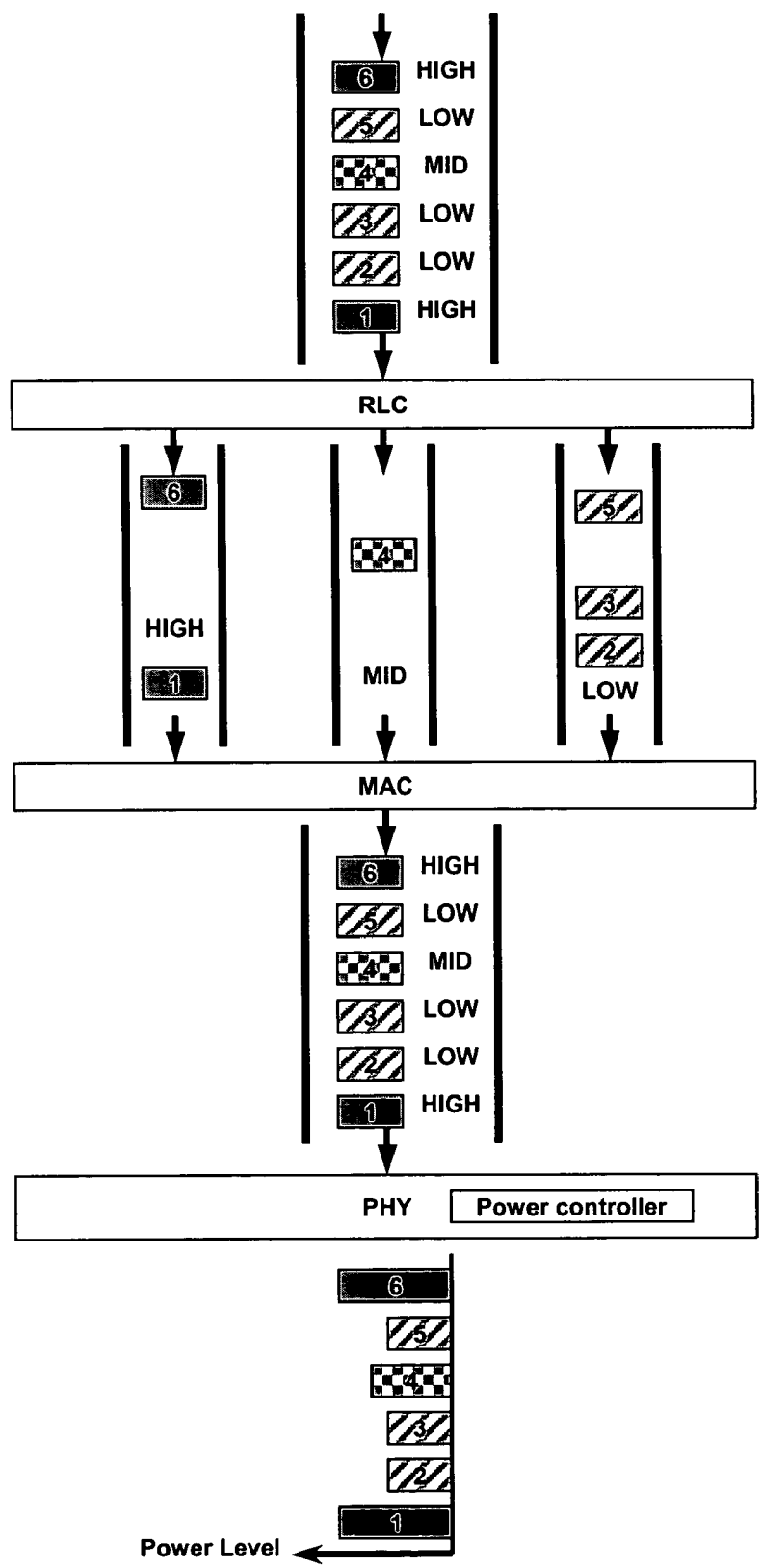
FIG. 9 depicts an exemplary method that combines the techniques of FIGS. 7 and 8.

FIG. 9 depicts an exemplary method that combines the techniques of FIGS. 7 and 8.

As explained thus far, in order to transmit data blocks over a radio (wireless) interface having a worse environment than a wired (fixed line) environment that allowed the data to be transmitted in a single stream, the present invention performs transmission with respectively different QoS guaranteed for each data block according to their priorities, to thus allow more important (higher priority) data to be transmitted much more reliably than less important (lower priority) data. If important data is lost during transmission over the radio interface, the affect on the overall QoS of the corresponding service is very high. However, employing the present invention is advantageous in that the overall QoS for a particular service can be greatly improved.

The present invention can employ a variety of software, hardware, and/or a combination thereof to achieve the above-identified procedures and steps for radio bearer (RB) release.

Figure 10:
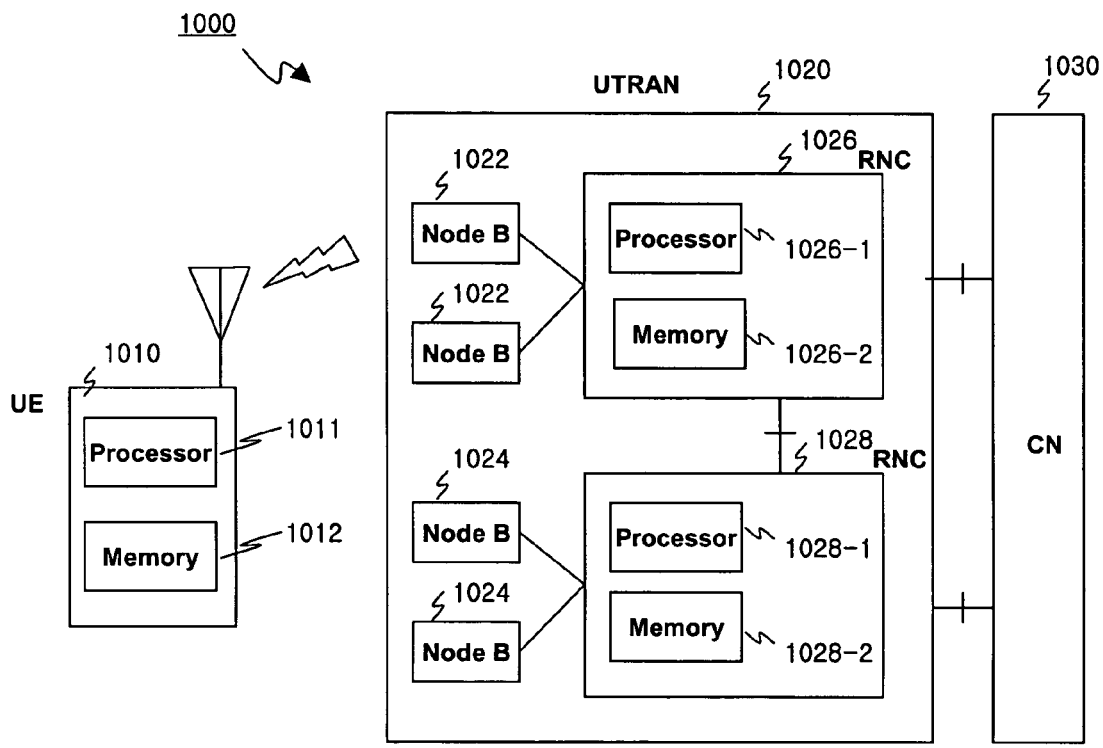
FIG. 10 depicts an exemplary communications system according to the present invention.

For example, FIG. 10 depict a communication system comprising a terminal (UE 1010) in radio communication with a network (UTRAN 1020 and CN 1030) according to an embodiment of the present invention. The network (UTRAN 1020 and CN 1030) may include various hardware and software components. For example, the UTRAN 1020 comprises an RNC (1026), being connected to a plurality of Node Bs (1022), and having a processor (1026-1) and a memory (1026-2). An RNC (1028), being connected to a plurality of Node Bs (1024), may also comprise a processor (1028-1) and a memory (1028-2). The RNCs (1026, 1028) are connected with one another via an interface, and connected with the CN (1030) via another interface. The network (UTRAN 1020 and CN 1030) handles the various processing procedures for communications with the terminal (UE 1010) as described previously. Here, it should be noted that various software codes and protocols that are required for achieving the present invention may be stored in one or more memory devices and executed by one or more processors located within the Node Bs (1022, 1024), the RNCs (1026, 1028), and/or other network elements.

The present invention is described with respect to mobile telecommunications, but can also be applied to wireless (radio) communications systems such as personal data assistants (PDAs) and notebook computers having wireless communications functions. Additionally, the terminology used in the present invention should not be limited to wireless (radio) communications systems such as UMTS, as the features of the present invention are applicable to other wireless (radio) communications systems (such as TDMA, CDMA, FDMA, etc.) that use various radio interfaces and physical channels.

The features of the present invention can be implemented in software, firmware, hardware, or any combination thereof. Namely, the features of the present invention may be implemented in hardware by using hardware logic such as codes, circuit chips and ASIC, or may be implemented as codes using computer programming languages stored in computer-readable storage media (such as hard disks, floppy disks, tapes, etc.), optical storage media, of other memory devices such as ROMs or RAMs.

The codes stored in the computer-readable storage media can be accessed and executed by a processor. The codes implementing the features of the present invention may be accessed through a transmission medium or may be accessed through a file server on a network. In such case, the devices having the codes implemented therein are comprised of wireline (fixed line) transmission mediums (such as a network transmission line), wireless (radio) transmission mediums, signal transmission, wireless (radio) signals, infrared signals, and the like.

Figure 11:
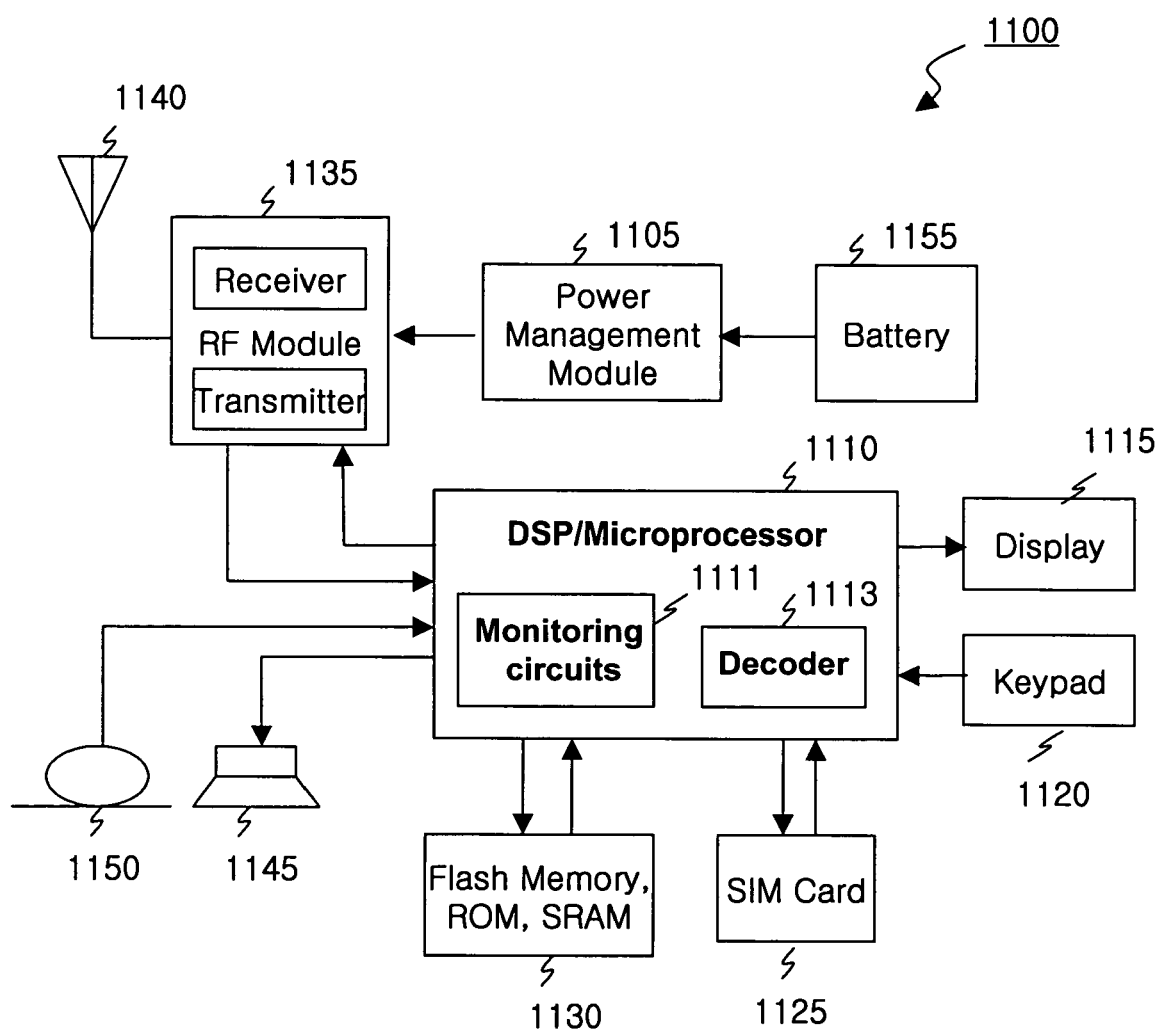
FIG. 11 depicts an exemplary mobile terminal according to the present invention.

FIG. 11 depicts a wireless communications device such as a mobile terminal (1100) that can perform the functions of the present invention. This wireless communications device is comprised of a processing unit module (1110) (such as a microprocessor or digital processor), a radio frequency (RF) module (1135), a power control module (1105), an antenna (1140), a battery (1155), a display module (1115), a keypad (1120), a flash memory storage module (1130, 1125) (such as a ROM or SRAM), a speaker (1145) and a microphone (1150).

The user can input command information such as phone numbers by pressing the buttons on the keypad, and can perform voice-activate commands through the use of the microphone. The processing unit module receives these commands and processes them to perform the functions requested by the user. Also, various data that are necessary in performing the above functions are used upon searching the storage module, and the processing unit module can visually display the user command information and the data searched from the storage media on the display module for the user's convenience.

The processing unit module transfers the command information to the RF module in order to transmit wireless (radio) signals including voice communication signals. The RF module includes a transceiver for transmitting and receiving wireless (radio) signals, and the wireless (radio) signals are ultimately transmitted and received through the use of the antenna. Upon receiving wireless (radio) signals, the RF module converts these wireless (radio) signals into baseband frequencies to allow processing thereof at the processing unit module. These converted signals are delivered through the speaker or delivered as readable information.

The RF module is used for receiving data from the network or for transmitting the information detected or generated at a wireless (radio) communications device to the network. The storage module is used to store the information detected or generated at the wireless (radio) communications device, and the processing unit module is appropriately used for receiving data from the wireless (radio) communications device, for processing the received data, or for transmitting the processed data.

Accordingly, the present invention provides a radio communications system comprising: a protocol layer adapted to perform the steps of, receiving data packets from an upper layer, each data packet having priority information related thereto generated by and sent from the upper layer; processing the received data packets by using the priority information; and transferring the processed data packets to a first lower layer according to the priority information.

Preferably, the first lower layer is adapted to perform the steps of: receiving the processed data packets having different priorities via at least one data flow; and transferring the received data packets to a second lower layer according to their respective priorities via respectively different logical channels.

Preferably, the second lower layer is adapted to perform the steps of: receiving the data packets from the first lower layer via at least one data flow; and transmitting the received data packets to a receiver by using different transmission power levels corresponding to the priorities.

Although various aspects, embodiments, and features of the present invention have been described for a UMTS communications scheme, many of these techniques can be advantageously applied for other communications methods and systems.

The foregoing description of the preferred embodiments is provided to enable any person skilled in the art to make or use the present invention. Various modifications to these embodiments will be readily apparent to those skilled in the art, and the generic principles defined herein may be applied to other embodiments. Thus, the present invention is not intended to be limited to the embodiments shown herein but us to be accorded the widest scope consistent with the principles and novel features disclosed herein.

What is claimed is:

1. A method of processing data packets for a radio communications system employing a protocol stack with protocol layers therein, the method comprising:
   receiving, by a radio link control (RLC) layer, data packets from a packet data convergence protocol (PDCP) layer, each data packet having priority information related thereto generated by and sent from the PDCP layer, wherein the priority information indicates whether the corresponding data packet includes a full header or a compressed header, wherein a data packet including a full header has higher priority than a data packet including a compressed header;
   processing, by the RLC layer, the received data packets by using the priority information; and
   transferring, by the RLC layer, the processed data packets to a first lower layer according to the priority information,
   wherein the data packets include protocol data units (PDUs) generated by way of the PDCP layer receiving service data units (SDUs) from an upper layer, performing header compression thereto to generate protocol data units (PDUs), and transferring to the RLC each generated protocol data unit (PDU) together with its priority information,
   wherein the transferring is performed by:
      transmitting the data packets repetitively and randomly according to their priorities,
      transmitting the data packets using respectively different radio channels according to their priorities,
      transmitting the data packets using respectively different radio transmission techniques for each radio channel according to their priorities, and
      transmitting the data packets via respectively different logical channels such that each logical channel is used to transfer data packets of a certain priority, wherein a total number of logical channels equals a total number of different priorities.

2. The method of claim 1, wherein the data packets are received in service data units and transferred in protocol data units.

3. The method of claim 1, wherein the first lower layer is a medium access control (MAC) layer.

4. The method of claim 1, further comprising:
   receiving, by the first lower layer, the processed data packets having different priorities via at least one data flow; and
   transferring the received data packets to a second lower layer according to their respective priorities via respectively different logical channels.

5. The method of claim 4, wherein a total number of data flows received from the first lower layer equals a total number of different priorities.

6. The method of claim 4, wherein the second lower layer is a physical (PHY) layer.

7. The method of claim 4, further comprising:
   receiving the data packets from the first lower layer via at least one data flow; and
   transmitting the received data packets to a receiver by using different transmission power levels corresponding to the priorities.

8. The method of claim 7, wherein data packets of relatively higher priority are transmitted by using a relatively higher transmission power.

9. The method of claim 7, wherein the steps are performed in order to guarantee respectively different qualities of service requirements.

10. The method of claim 7, wherein the receiver is a mobile station, a user equipment, or other communications terminal.

11. A radio communications system comprising:
    a protocol layer adapted to perform the steps of,
    receiving, by a radio link control (RLC) layer, data packets from a packet data convergence protocol (PDCP) layer, each data packet having priority information related thereto generated by and sent from the PDCP layer, wherein the priority information indicates whether the corresponding data packet includes a full header or a compressed header, wherein a data packet including a full header has higher priority than a data packet including a compressed header;
    processing, by the RLC layer, the received data packets by using the priority information; and
    transferring, by the RLC layer, the processed data packets to a first lower layer according to the priority information, wherein the transferring is performed by transmitting the data packets repetitively and randomly according to their priorities, transmitting the data packets using respectively different radio channels according to their priorities, transmitting the data packets using respectively different radio transmission techniques for each radio channel according to their priorities, and transmitting the data packets via respectively different logical channels such that each logical channel is used to transfer data packets of a certain priority, wherein a total number of logical channels equals a total number of different priorities.

12. The system of claim 11, wherein the data packets are received in service data units and transferred in protocol data units.

13. The system of claim 11, wherein the PDCP layer receives and performs header compression on service data units (SDUs), to generate protocol data units (PDUs), and transfers each generated PDUs together with its priority information.

14. The system of claim 11, wherein the first lower layer is a medium access control (MAC) layer.

15. The system of claim 11, wherein the first lower layer is adapted to perform the steps of: receiving the processed data packets having different priorities via at least one data flow; and transferring the received data packets to a second lower layer according to their respective priorities via respectively different logical channels.

16. The system of claim 15, wherein a total number of data flows received from the first lower layer equals a total number of different priorities.

17. The system of claim 15, wherein the second lower layer is a physical (PHY) layer.

18. The system of claim 15, wherein the second lower layer is adapted to perform the steps of: receiving the data packets from the first lower layer via at least one data flow; and transmitting the received data packets to a receiver by using different transmission power levels corresponding to the priorities.

19. The system of claim 18, wherein data packets of relatively higher priority are transmitted by using a relatively higher transmission power.

20. The system of claim 18, wherein the steps are performed in order to guarantee respectively different qualities of service requirements.

21. The system of claim 18, wherein the receiver is a mobile station, a user equipment, or other communications terminal.

* * * * *